United States Patent [19]

Zweifel

[11] Patent Number: 4,651,563

[45] Date of Patent: Mar. 24, 1987

[54] JET ENGINE TESTING APPARATUS

[75] Inventor: Terry L. Zweifel, Phoenix, Ariz.

[73] Assignee: Sperry Corporation, New York, N.Y.

[21] Appl. No.: 787,893

[22] Filed: Oct. 16, 1985

[51] Int. Cl.⁴ .......................................... G01M 15/00
[52] U.S. Cl. ........................................ 73/116; 364/551
[58] Field of Search ................ 73/116, 117.3; 364/551

[56] References Cited

U.S. PATENT DOCUMENTS

| | | | |
|---|---|---|---|
| 3,238,768 | 3/1966 | Richardson | 364/551 |
| 3,731,070 | 5/1973 | Urban | 364/551 |
| 3,867,717 | 2/1975 | Moehring et al. | 73/117.3 |
| 4,158,884 | 6/1979 | McKinley et al. | 364/551 |
| 4,215,412 | 7/1980 | Bernier et al. | 364/551 |

Primary Examiner—Michael J. Tokar
Assistant Examiner—Robert R. Raevis
Attorney, Agent, or Firm—Howard P. Terry; Seymour Levine

[57] ABSTRACT

An apparatus for detecting jet engine failures during aircraft flight. Low and high speed rotor rotation velocities of one engine are compared with low and high rotor rotation velocities of other engines and the difference between them utilized to determine engine failure. Equivalent low speed rotor velocity of an engine is computed from the high speed rotor velocity of that signal. This computed value is compared with measured low speed rotor velocity of the same and of different engines. Differences between the computed values and the actual values are compared to a computed threshold, which allows for normal differences between engines, to determine the operational state of the engine. Additional engine testing is performed by comparing low speed rotor rotational velocity to a computer windmilling value for each engine.

15 Claims, 11 Drawing Figures

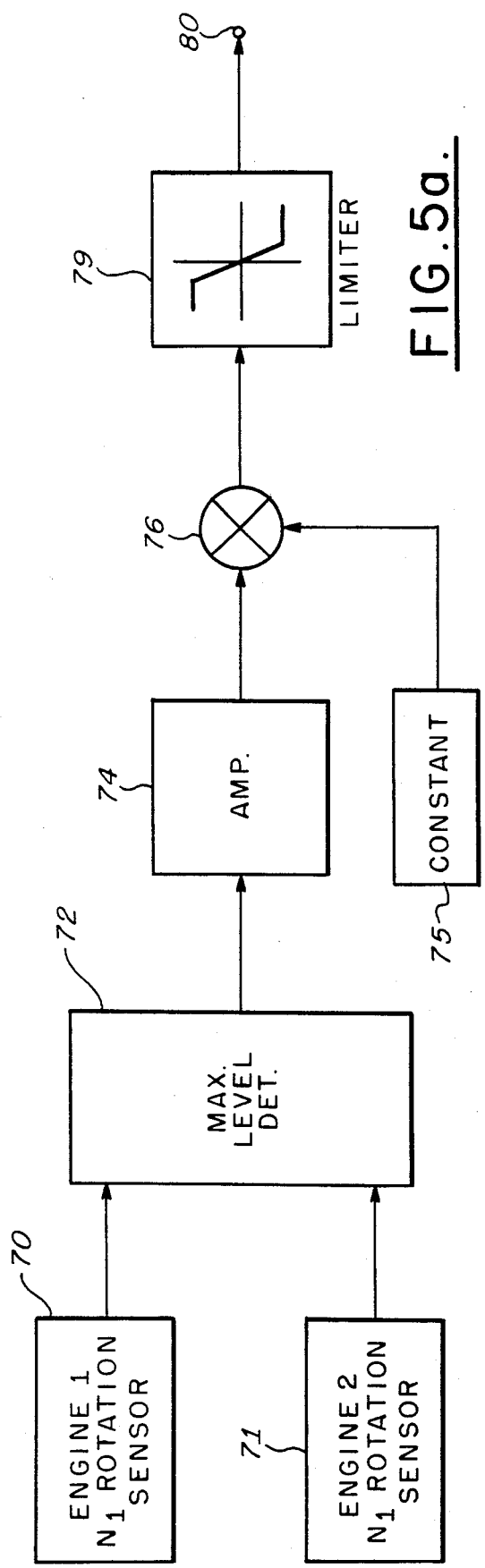
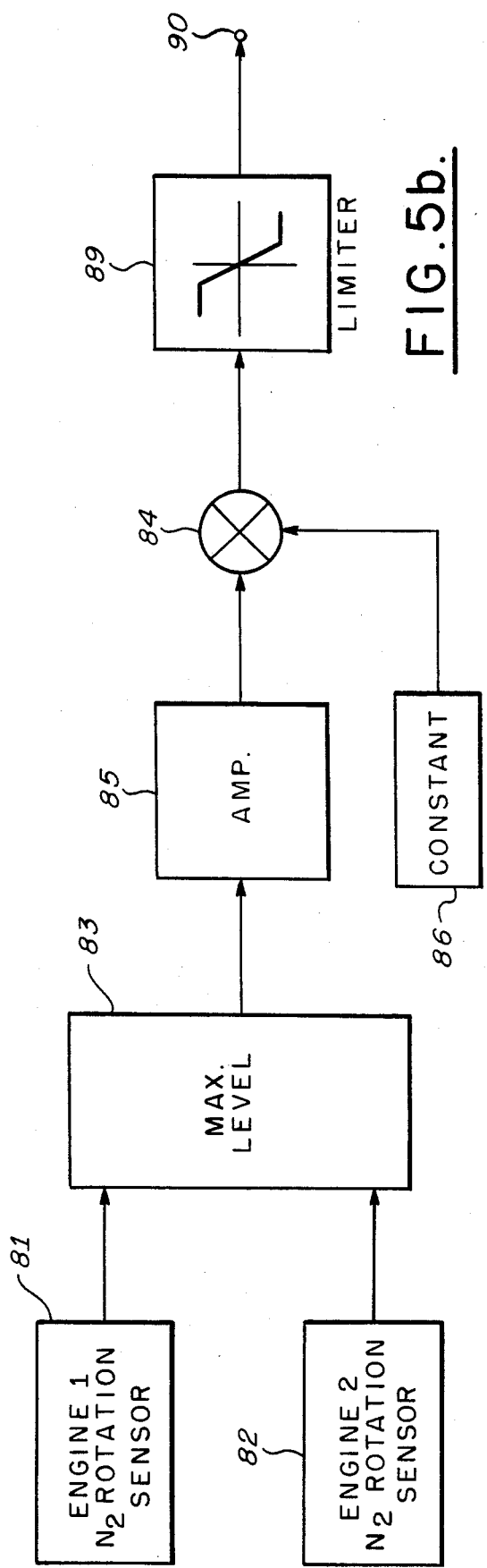

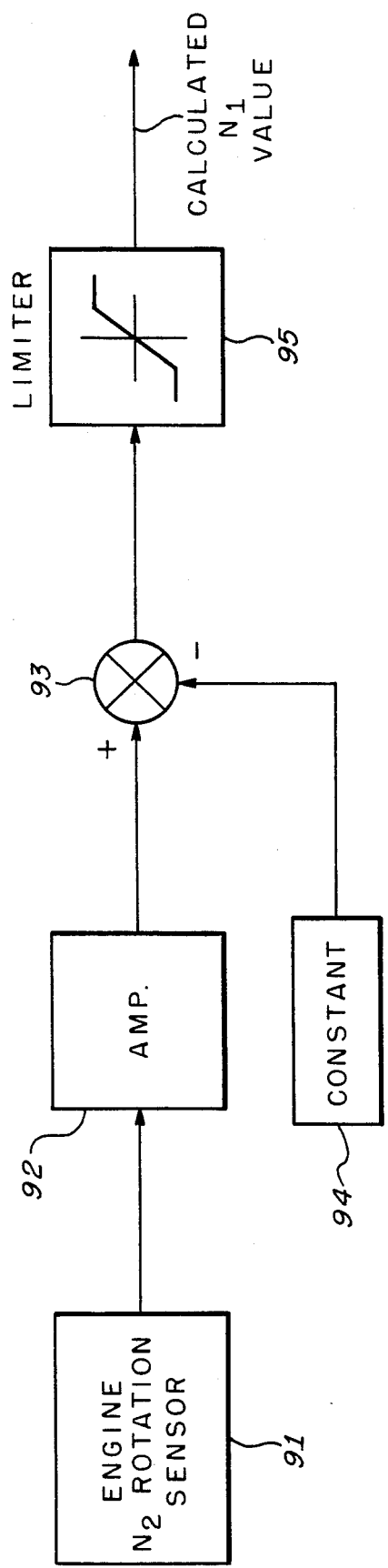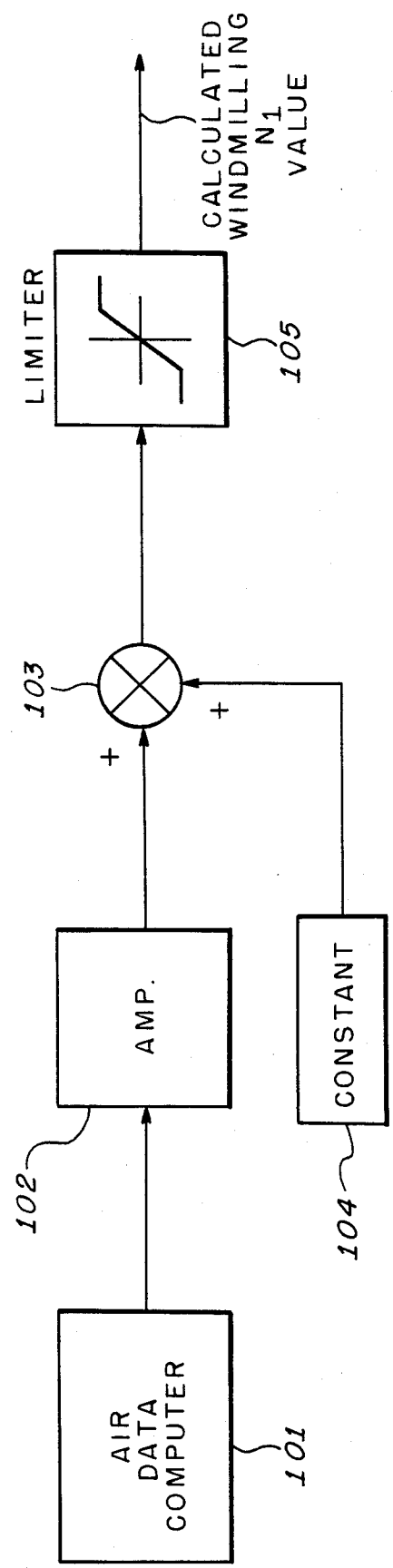

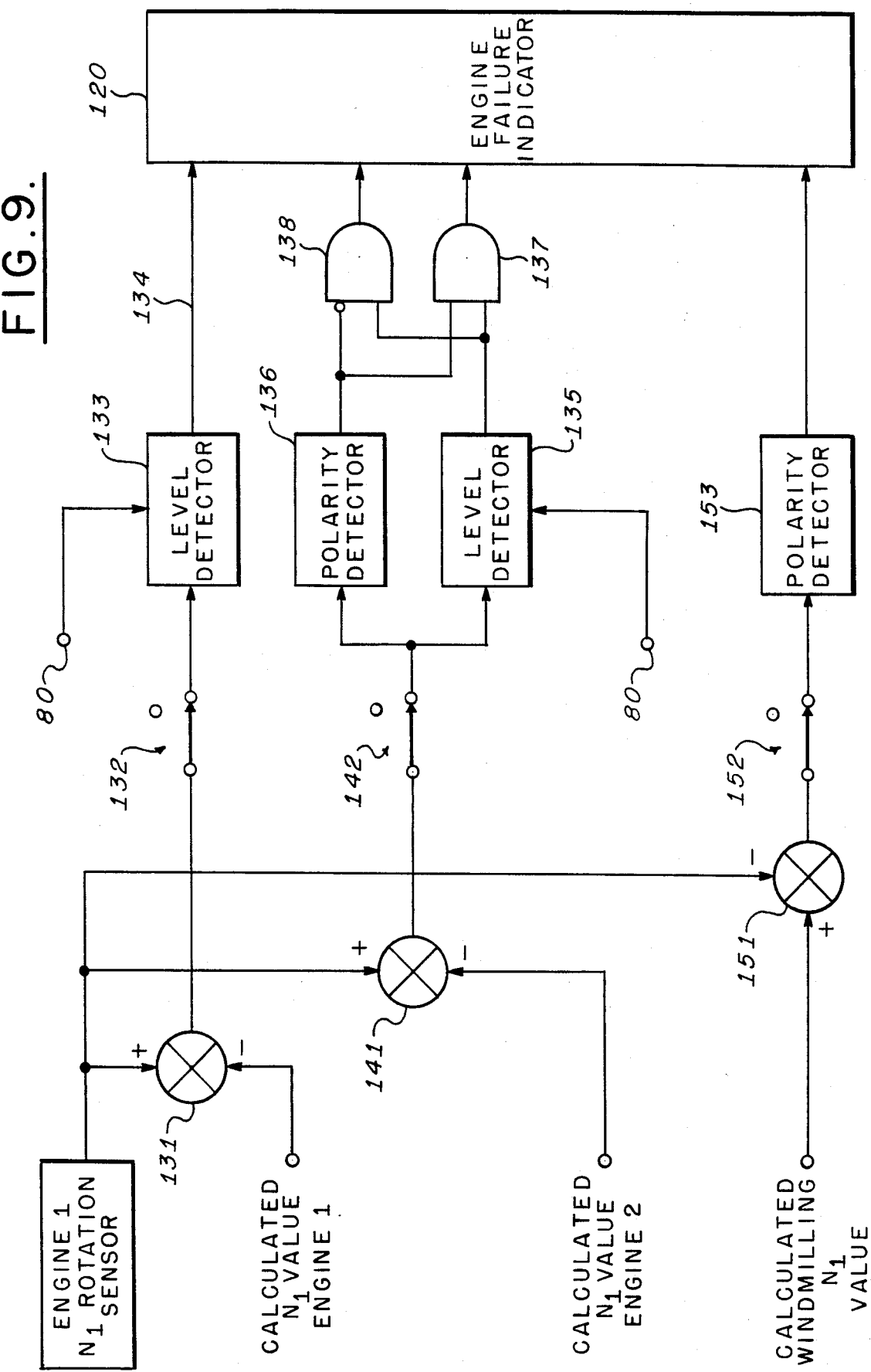

JET ENGINE TESTING APPARATUS

BACKGROUND OF THE INVENTION

1. Field of the Invention

The present invention relate generally to a jet engine testing, and more specifically to failure detection of jet engines on aircraft during all phases of flight.

2. Description of the Prior Art

Many commerical transport aircraft, general aviation aircraft, and military aircraft, are powered by turbojet or turbofan engines. Computers onboard the aircraft are utilized for the determination of engine failures from monitored engine parameters. Computer command speeds and thrust settings for safely flying the aircraft, after a failure has been detected, are displayed to the human pilot or provided to an automatic flight control system.

Prior art jet engine failure detection systems monitor Engine Pressure Ratio (EPR) and Exhaust Gas Temperature (EGT). EPR is derived from pressure sensors mounted in the air inlet and the exhaust nozzle of the engine. The ratio of these two pressures is a direct measure of the thrust of the engine, where EGT is derived from a temperature sensor mounted in the exhaust nozzle of the engine.

Systems utilizing these parameters for jet engine failure detection have numerous short comings. EPR cannot be used during an aircraft's decent, because the EPR during this phase of flight is substantially equal to the EPR of the failed engine. Additionally, the EPR while an aircraft is cruising is small, making the determination of EPR level at which an engine may be considered to have failed, during this phase of flight, extremely difficult. Further, the air quality and temperature in the operating regions may cause pressure sensors positioned in the air inlet to become clogged with ice or debris, thereby producing erroneous measurements.

Measuring EGT also does not provide reliable jet engine failure indications. As for example, the EGT of an engine on fire remains near that of an normally operating engine for an appreciable time period after the start of the fire. Further, since residual heat is dissipated into the atmosphere the EGT, of an engine that has failed for reasons other than fire, is an exponential decay exhibiting a long time constant. Consequently, a significant time lapse may occur before an alarm is given. Another deficiency of the EGT method results from the fact that different models of the same engine may exhibit appreciably different EGTs at idential thrust settings, thereby creating the possibility of a false failure indication.

The limitations inherent in the use of EPR and EGT engine parameters cause failed engine detection to be flight phase dependent; i.e., a different set of criteria must be used for takeoff, cruise, descent etc. Engine failure detection systems utilizing these measurements exhibit high probabilities of erroneous failure detection when the aircraft transitions from one phase of flight to another, as per example, as going from climb to cruise.

Most modern day turbojet or turbofan engines utilize two rotor shafts, the first, a low speed rotor, rotating at $N_1$ revolutions per minute and the second, a high speed rotor, rotating at $N_2$ revolutions per minute. A compressor stage, for compressing incoming atmospheric air, is positioned on each rotor shaft near the air inlet end, while a turbine is mounted on the rotor shaft at the end opposite the compressor. As the exhaust gas exits the engine it passes through the turbine blades causing the rotor to rotate, thereby driving the compressor section. Generally rotor angular velocity is expressed as a precentage of the maximum allowable rotational velocity. The determination of the high and low speed rotor angular velocities allows engine failure detection to be completely independent of the flight phase, thus permitting the use of constant engine failure criteria for all flight phases. The rotation velocities $N_1$ and $N_2$ are interrelated, one being determinable from the other, for any thrust setting, by a well defined function. This relationship may be utilized to compare the computed and measured shaft rotation speeds for an engine. Additionally, the shaft rotation speed on one engine may be compared to the shaft rotation speed of all other engines mounted on the aircraft.

Other turbojet, turbofan engine characteristics may be calculated or measured for the determination of engine failure. In turbojet, turbofan engines rotors of a failed engine, that are not jammed, will rotate due to the forward motion of the aircraft. This rotation, known as windmilling, has an angular velocity which is a linear function of the aircraft Mach number, thereby providing an additional parameter for detection of a failed engine.

SUMMARY OF THE INVENTION

A jet engine tester made in accordance with the principles of the present invention includes sensing devices that provide electrical signals representative of the rotation rates of the high and low speed rotors in a turbofan or turbojet engine. The high and low speed rotor representative signals for each aircraft are respectively subtracted from the high and low speed rotor representative signals of a selected one engine of all the engines on the aircraft to obtain high and low speed rotor difference signals. The level of these difference signals are respectively compared to high and low speed rotor threshold signals derived from signals representative of the maximum high and low speed rotor rotation rate of all the jet engines on the aircraft. Identification of an engine that has failed is determined from the comparison of the difference signal level with the threshold signal and the polarity of the difference signal.

Each engine is also checked by deriving a signal from the representative signal of the high speed rotor rotation rate that is equivalent to the representative signal of the low speed rotor rotation rate of a normally operating engine. This equivalent signal is subtracted from the signal representative of the low speed rotor rotation rate of the reference engine to derive a difference signal that is compared to the low speed rotor rotation rate threshold signal. The level and polarity of each of these difference signals is determined and utilized to establish and identify failed engines.

Further testing for engine failure is performed by comparing the signals representative of the low speed rotor rotation rate to a signal, derived from the aircraft's forward velocity, that is representative of the rate at which the low speed rotor will rotate due to the flow of air through the engine at the aircrafts forward velocity. An engine failure indication is given when this comparison shows that the calculated windmilling rotation rate exceeds or equals the sensed rotation rate of the low speed rotor.

BRIEF DESCRIPTION OF THE DRAWINGS

FIGS. 5a and 5b are block diagrams of the circuitry utilized for deriving threshold signals utilized in the invention.

FIG. 6 is a block diagram of circuitry utilized for deriving signals representative of the rotation rate of the low speed rotor, of a normally operating jet engine, corresponding to a sensed rotation rate of the high speed rotor.

FIG. 7 is a block diagram of circuitry utilized from determining the windmilling rotation rate of a jet engine from measured forward aircraft velocity.

FIG. 9 is a block diagram of circuitry utilized for the comparison of measured low speed rotor rotation rates to computed low speed rotor rotation rates and to computed windmilling rotation rates.

DESCRIPTION OF THE PREFERRED EMBODIMENTS

The engine failure detection scheme of the present invention utilizes the measurements of the low and high speed rotor shaft rotational velocities of a turbojet or turbofan engine. While the present invention may be used on aircraft having any number of engines, for the sake of clarity of explanation, the following discussion will assume an aircraft having just two engines.

Figure 1:
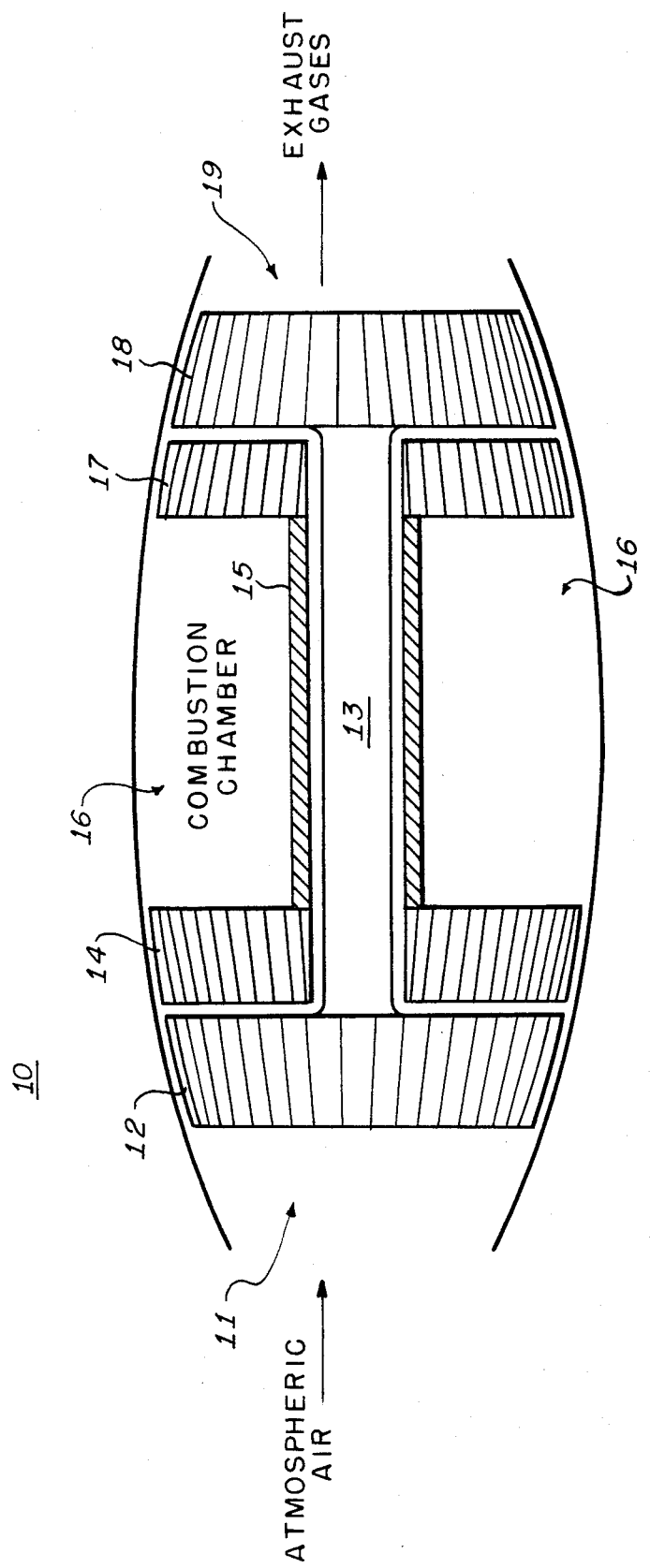
FIG. 1 is a simplified cross sectional view of a typical turbojet engine useful for explaining the general operation of the engine.

FIG. 1 is a simplified longitudinal cross sectional view of a typical jet engine 10. Under normal conditions, atmospheric air enters the engine through inlet 11 to be compressed by a low speed compressor 12, physically connected to a low speed rotor shaft 13. Compressed air from the low speed compressor 12 is passed, for further compression, to a high speed compressor 14, physically connected to a high speed rotor shaft 15. Highly compressed air from the high speed compressor 14 is then passed to combustion chamber 16, wherein the air is mixed with fuel and ignited. Combustion gas products pass through high speed turbine 17, physically attached to high speed rotor shaft 15, causing rotation of the high speed turbine 17, high speed rotor shaft 15 and high speed compressor 14. These gases also pass through low speed turbine 18 causing rotation of the low speed turbine 18, low speed rotor shaft 13, and low speed compressor 12 prior to exiting the engine through exhaust nozzle 19 to produce the engine thrust. It should be apparent from this illustration that the high and low speed stages are mechanically decoupled, the action of one affecting the action of the other only by the flow of air through the engine.

The rotational velocity low and high speed rotor shafts, $N_1$ and $N_2$ respectively, may be measured by a tachometer or any other suitable means and supplied to an on-board computer in units of percentage of the maximum allowable rotational velocity. These measured engine velocities may be utilized in the computer for the determination of an engine failure.

Figure 2:
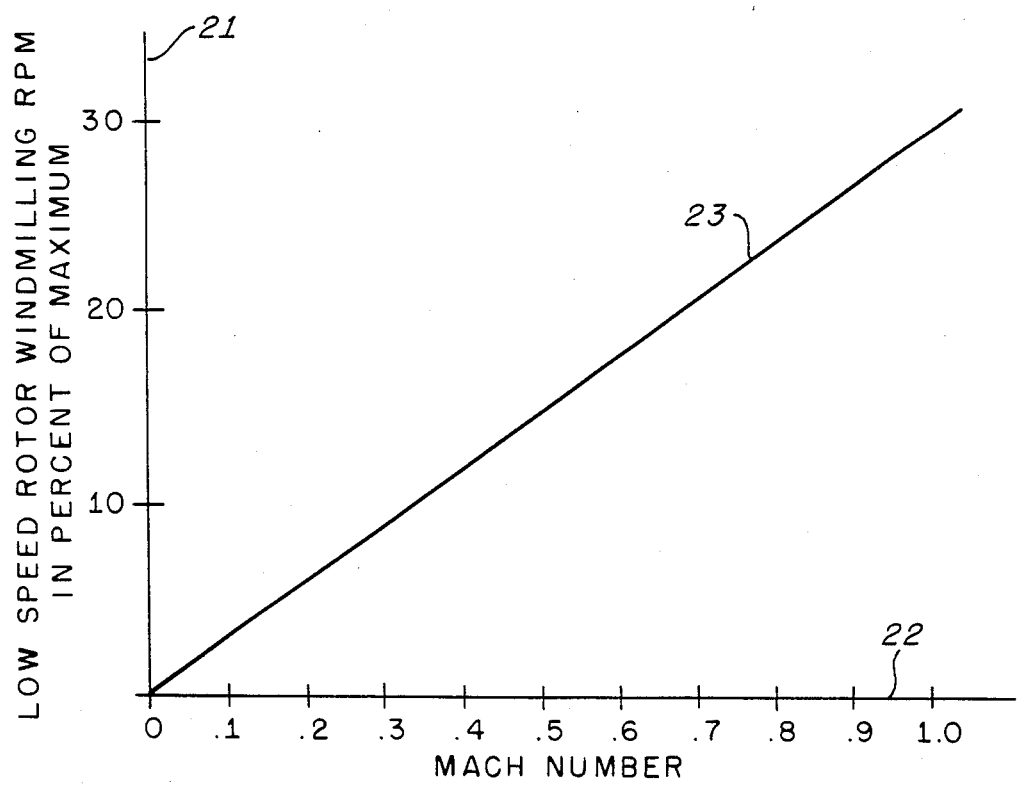
FIG. 2 is a graph illustrating the relationship between turbojet engine windmilling revolution rate and the Mach number of the aircraft.

A turbojet or turbofan engine may fail in any of a number of ways, the most common being failure of the fuel air mixture to ignite. When this occurs combustion gases have relatively low energy and cannot maintain sufficient rotational velocities for turbine 17 and 18. Neither rotor, however, ceases to rotate since the air force through the engine by the aircraft's forward velocity causes both to windmill at a rotational speed that is proportional to the Mach number of the aircraft's forward velocity. The relationship between the rotational velocity of the low speed rotor due to windmilling and the forward velocity Mach number is shown in FIG. 2, wherein the vertical axis 21 is the low speed rotor shaft rotational velocity expressed in percent of the maximum allowable rotational velocity, while the horizontal axis 22 is the aircraft Mach number. Straight line 23 represents the relationship between the two parameters, expressed as:

$$N_1 = k_1 M \qquad (1)$$

where:

$N_1$ = the rotational velocity of the low speed rotor shaft due to windmilling expressed in percent of maximum allowable velocity.

$k_1$ = a proportionality constant.

M = the aircraft's Mach number.

Figure 3:
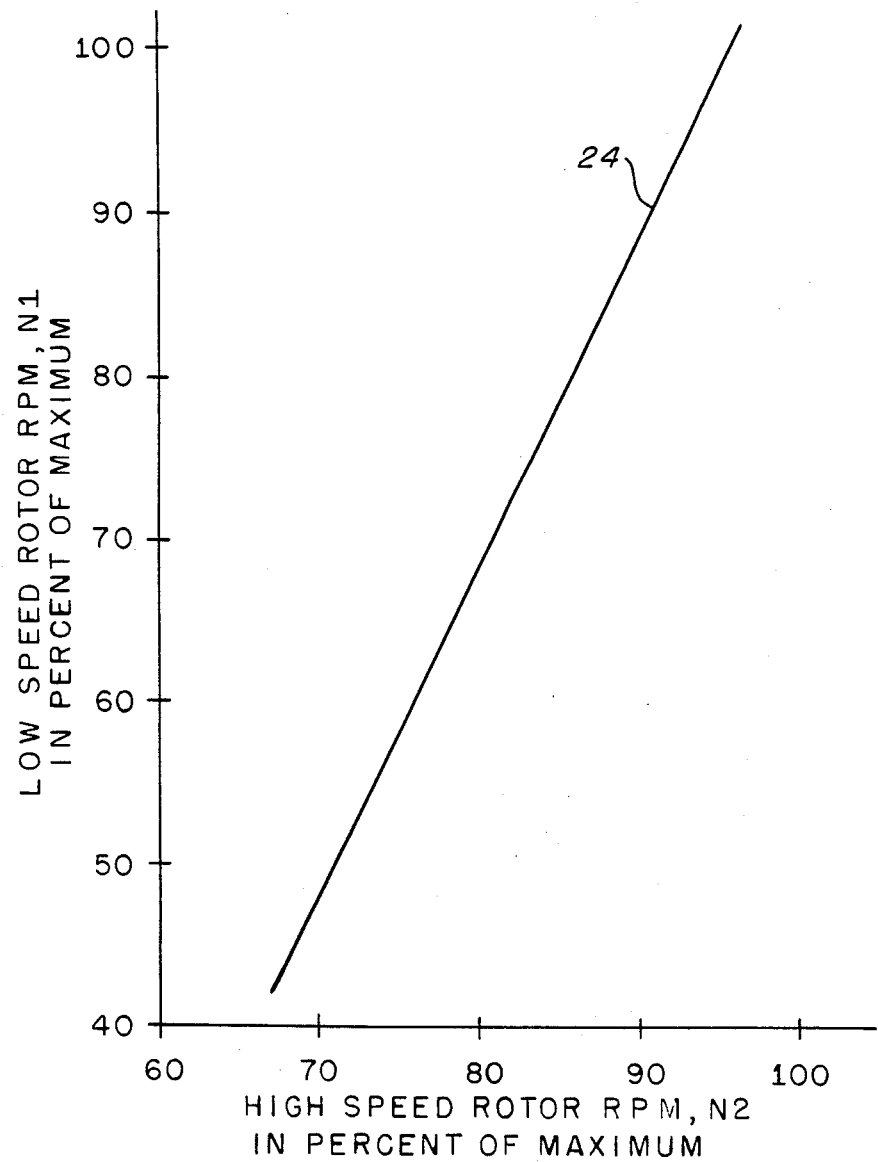
FIG. 3 is a graph illustrating the relationship between the low and high speed rotor rotation rates for a properly operating turbojet engine.

Though the high and low speed rotors are not mechanically coupled, the action of the combustion gases passing through the high speed turbine 17 and low speed turbine 18 cause the two rotors to rotate at angular velocities that are approximately linearly related. This approximate linear relationship, shown in FIG. 3 as line 24, may be expressed in terms of the percentages of the maximum allowable high and low speed rotation rates by the equation:

$$N_1 = k_2 N_2 - C \qquad (2)$$

where $k_2$ and C are appropriate constants. This relationship and the windmilling rotation rate dependence on the forward velocity Mach number of the aircraft provide criteria for the determination of the failed engine in the present invention.

Figure 4:
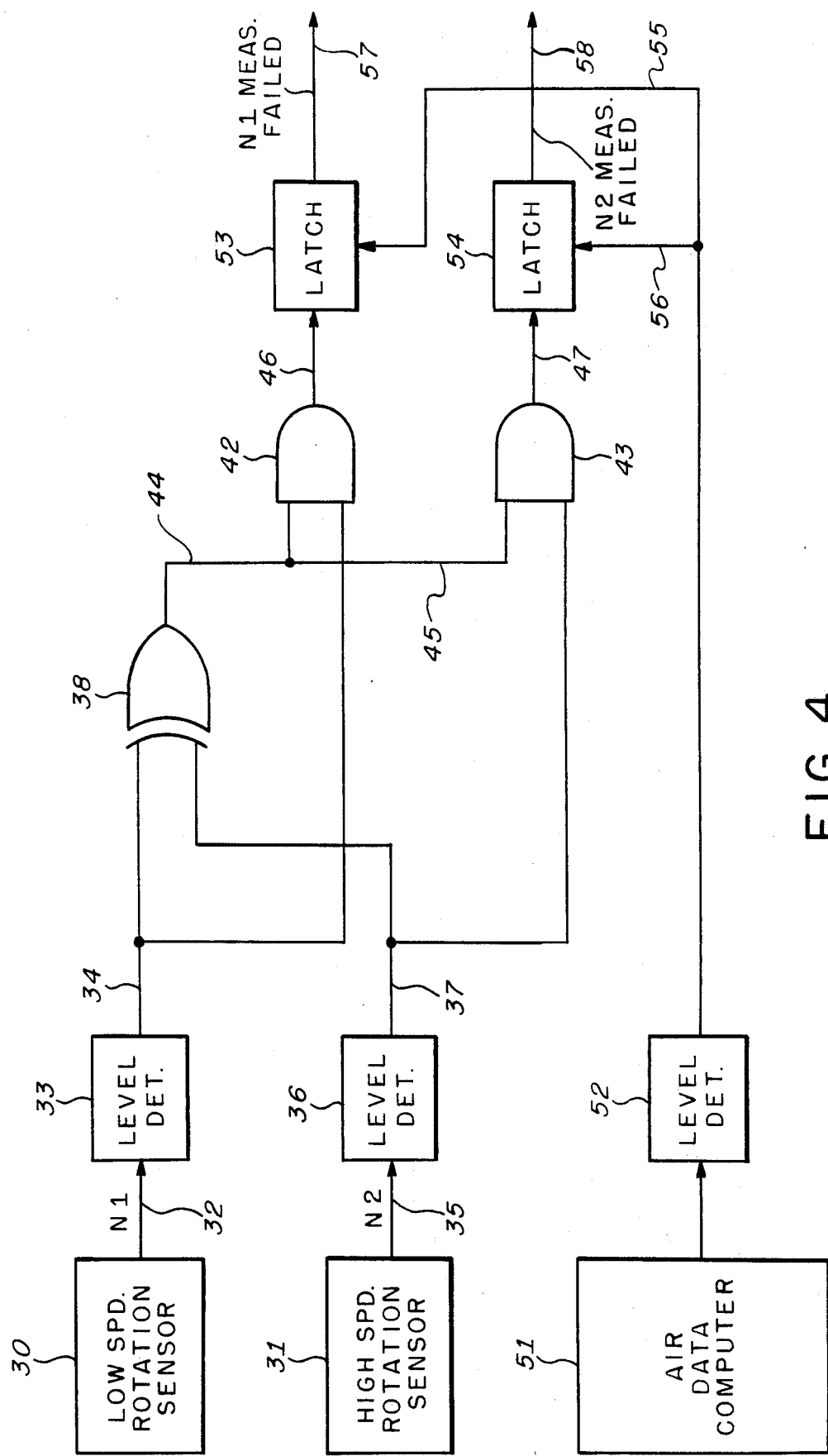
FIG. 4 is a block diagram of the circuitry utilized for determining the integrity of the rotation rate sensors.

Properly operating measurement equipment is required to provide reliable engine fault detection. A block diagram of an apparatus for testing the rotation sensors prior to take off is presented in FIG. 4. A signal representative of the $N_1$ measurement obtained from a low speed rotation sensor 30 under tests, which may be a tachometer with a frequency to voltage converter, is supplied via lead 32 to level detector 33. Level detector 33 provides a logic 1 via lead 34 whenever the $N_1$ representative signal exhibits a value below a threshold signal that is representative of a selected rotational rate, as for example, 15% of maximum allowable rotational velocity, and a logic zero otherwise. In a similar fashion, a signal representative of the $N_2$ measurement from a high speed rotation sensor 31 under test is coupled via lead 35 to level detector 36, wherefrom a logic 1 is coupled via lead 37 whenever the $N_2$ representative signal indicates a value below a selected threshold and logic zero otherwise. The logic signals on leads 34 and 37 are coupled to a conventional exclusive OR gate 38, wherefrom a logic 1 is coupled to AND gates 42 and 43 via leads 44 and 45 when one and only one of the logic signals on leads 34 and 37 is a logic 1, otherwise the signals coupled to leads 44 and leads 45 are logic zeros. Second input terminals of AND gates 42 and 43 are respectively coupled to receive the logic signals from level detectors 33 and 36. Since each AND gate 42 and 43 provides a low level logic signal when a low level signal is coupled to either one of the two input terminals and a high level signal when high level logic signals are coupled to both input terminals, a logic 1 is coupled to lead 46 whenever the rotational velocity measurement for the low speed rotor indicates a low speed rotor velocity below the said threshold. In a like manner a logic one is coupled to lead 47 whenever the rotational velocity measurement for the high speed rotor indicates a high speed rotor velocity below the threshold. Those skilled in the art recognize that a valid measurement is indicated when both the high and low speed rotors fail simultaneously. This ambiguity is readily resolved for it would not be possible for the plane to take off under these conditions. Further, the probability of such an occurrence is extremely small.

Similar logic may be employed to determine rotational velocity indications that are higher than the actual rotational speed of the rotors. This logic utilizes the threshold signal amplitude above the maximum allowable rotation velocity, as for example 15%, to provide a logic 1 output from the level detectors when the rotational velocities exceeding this threshold are indicated. An indication of a valid measurement may occur when both sensors are providing erroneously high signal amplitudes. The probabilities, however of both sensors simultaneously providing speed indications greater than 15% above the actual rotor speed is an insignificantly low value.

Concurrently with the action described above, a signal proportional to the aircraft's Mach number is coupled from the air data computer 51 to a third level detector 52. Level detector 52 operates to provide a logic 1 output signal when the Mach number of the aircraft velocity exceeds a predetermined value, as for example, Mach 0.12, a speed readily achieved during taxi, and a logic zero otherwise. This logic signal is coupled to latches 53 and 54 via lines 55 and 56 respectively. Latches 53 and 54 latch the signals respectively coupled thereto from lines 46 and 47 and maintain these logic signals for the duration of a high level logic signal coupled from the level detector 52. Once high level logic signals simultaneously appear at the input terminals of latches 53 and 54, these latches maintain a high level signal at the respective output terminals 57 and 58, even though a low level logic signal is subsequently coupled from the sensor test circuitry.

Simultaneously high level logic signals from AND gates 42 and 43 are an indication that one of the sensors has failed.

When the aircraft begins to accelerate for takeoff, its speed increases until its exceeds the Mach number threshold level set for the level detector 52. At this time a high level logic signal is coupled to latches 53 and 54 forcing each to maintain logic signals coupled via leads 46 and 47 respectively. It is reasonable to assume that the aircraft would not accelerate for takeoff with an engine that has failed.

Thus it may be reasoned that the latches were set properly.

It is also reasonable to assume that not both $N_1$ and $N_2$ measuring devices have failed. Consequently, high level logic signals simultaneously coupled from AND gates 42 and 43 signify that the $N_1$ measuring logic has failed or that $N_2$ measuring logic has failed. In this manner the status of the two measuring devices is determined before the aircraft has the left the ground.

Rotor rotation threshold levels may be determined for the engines on the aircraft. Differences in throttle level-handle-to-engine fuel control valve rigging and differences in fuel control valves from engine to engine cause significant variations in rotor rotational velocities with thrust increase commands. Often a given engine would achieve a desired thrust setting significantly before another engine of the same type. The threshold levels are functions of the maximum measured RPM and the idle RPM of the engines and are set to account for the variations noted above. A block diagram of and apparatus for determining the threshold values for the low speed rotor is shown in FIG. 5a. The signals representative of $N_1$ from the first and second engine measuring devices 70, 71 are coupled to a maximum level detector 72, wherein the greater of the two $N_1$ representative signal levels is selected and coupled to an amplifier 74, having a gain that is representative of a desired scale factor. Signals at the output terminals of amplifier 74 are subtracted from the output signals of a constant signal generator 75 in a difference circuit 76. The amplifier 74 gain and the level of the constant signal are chosen to provide threshold signals at the output of the difference circuit 76 which are linearly proportional to the maximum measured $N_1$ signal and exhibits a zero crossing at a desired fraction of the rotation rate of the maximum measured $N_1$ signal. To establish a rotation rate range about the desired rotation rate, this difference signal is coupled to a limiter 79, wherefrom signals are coupled to output terminal 80 that are between two desired limits, as for example between signals representing 25% and 15% of the rated maximum rotation rate for the low speed rotor with a zero crossing at 20% of the rated maximum rotation rate.

The signals coupled to output terminal 80 are thresholds used in a subsequent process, to be described, for comparing the $N_1$ measurements of other engines.

Threshold values for the $N_2$ measurements signals are established in a similar manner. Referring to FIG. 5B, $N_2$ representative signals for the high speed rotors of the engines are coupled from $N_2$ measuring devices 81, 82 to a maximum level detector 83. The signal representative of the maximum $N_2$ rotational velocity is coupled to the difference terminal of a difference circuit 84 via an amplifier 85, while the constant level signal is coupled to a positive terminal at the difference circuit from a constant signal generator 86. This constant signal may be representative of twice the rated maximum rotational velocity of the high speed rotors. The constant and the gain of the amplifier 85 are chosen to provide threshold signals that are linearly proportional to the maximum measured rotational speed and a zero crossing at a desired fraction of the rated maximum speed. To establish a rotation rate range for the high speed rotors, the linearly varying signals are coupled to a limiter 89 which is set to constrain the signal levels coupled to the terminal 90 to be between two determined limits, as for example 40% and 20% of the maximum rate rotational speed of the high speed rotors with a zero crossing at 30% of maximum. Hence the magnitude of the signal at terminal 90 represents a linear function constrained to values between the upper and lower values of limiter 89 and is used in the determination of an engine failure based on $N_2$, a process to be discussed subsequently.

A block diagram of a circuit that may be employed for deriving an average rotation rate of the low speed rotor, in a normally operating engine, from the measured rate of the high speed rotor is shown in FIG. 6. The signal representative of the rotational velocity of the high speed rotor $N_2$ is coupled from the rotational velocity measuring device 91 to an amplifier 92, having a gain consistent with the coefficient of $N_2$ in equation 2. The output of the amplifier, which is equivalent to $k_2 N_2$, is coupled to a conventional summation network 93. A constant value signal representing the constant term in equation 2 is also coupled from a constant signal generator 94 to summation network 93. The sum signal is coupled to a limiter 95 configured to provide output signals between levels corresponding to zero and 100% of the maximum nominal rotation velocity of the low speed rotor. Thus the output signal of the limiter is representative of a nominal velocity of the low speed rotor corresponding to the measured velocity of the high speed rotor. The limiter 95 output signal is utilized in engine failure determination circuitry to be described subsequently.

A signal representative of the speed at which the low speed rotor would windmill is established in a similar manner. Refer now to FIG. 7, a signal from the air data computer 101 representative of the aircraft's forward velocity is coupled to an amplifier 102. The output signal from amplifier 102 representative of the term $k_1 M$ in equation 1 is coupled to a conventional summation network 103. A signal at a constant amplitude representative of a selected low speed rotor rotation velocity, as for example 3% of the nominal maximum rotation velocity, is coupled to summation network 103 from constant level signal generator 104. This added constant value increases the windmilling representative signal from the amplifier 102 to allow for windmilling variances between engines. Output signals from summation network 103 are coupled to a limiter 105 wherein the signal is limited to levels between 25 and 100% of the maximum windmilling rotation rate for an average engine. The output signals from limiter 105 thus represent an engine's windmilling rotation rate, within the specified limits, at the forward velocity of the aircraft.

Figure 8A:
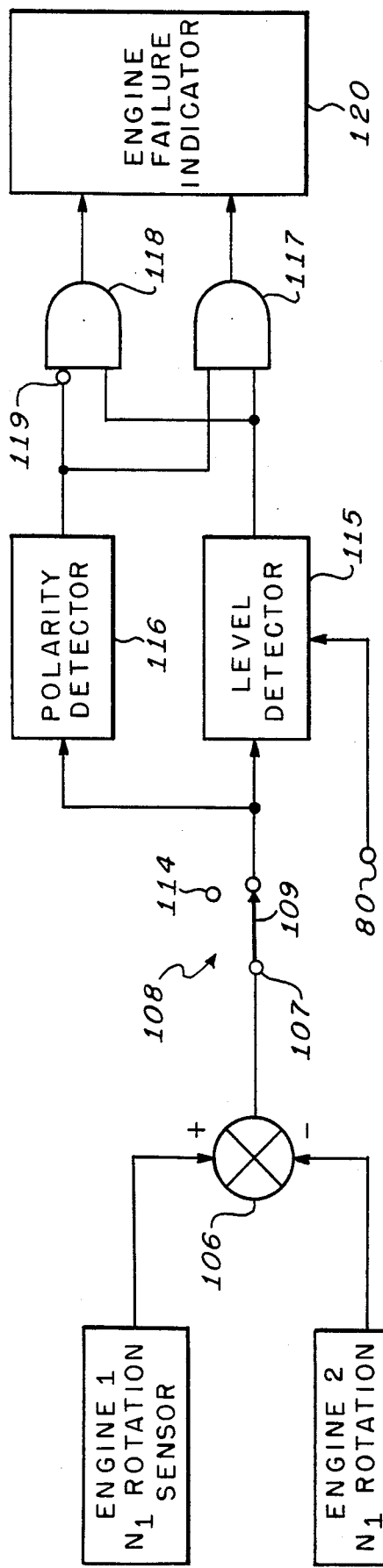
FIGS. 8A and 8B are block diagrams of circuitry utilized for comparing rotation rates of corresponding rotors in two engines to test for engine failure.

The signals derived, as described above, are utilized to detect engine failures during flight and to identify which engine has failed. Referring to FIG. 8a, the signals representative of the low speed rotor rotational velocity $N_1$ of first and second engines are coupled to a differencing circuit 106, wherefrom the difference of these signals, indicative of the difference between low speed rotor rotation velocities of the two engines, is coupled to the wiper arm terminal 107 of a switch 108. The wiper arm 109 of the switch 108 will be in the position shown when proper operation of the low speed rotor rotation sensors, for each engine, has been verified by the process previously described. If either or both of the $N_1$ measurements has been determined to be invalid, wiper arm 109 is moved to make contact with terminal 114, disabling the fault identifying circuit and preventing erroneous fault indications. When both $N_1$ measurements are valid the difference signal is coupled to level detector 115 and polarity detector 116. Detector 115 compares the absolute value of the difference signal to the absolute value of the signal, appearing at terminal 80 FIG. 5a, representative of a percentage of the maximum low speed rotor rotation velocity. If the difference signal coupled from differencing circuit 106 exceeds the level of the signal at terminal 80, detector 115 couples a logic 1 signal to AND gates 117 and 118, otherwise a logic zero is coupled to the AND gates 117 and 118. Polarity detector 116 couples a logic 1 signal to AND gate 117 and to an inverting terminal 119 of AND gate 118 when the low speed rotor rotation velocity of the first engine is greater than low speed rotor rotation velocity of the second engine, and logic zero to AND gate 117 and inverting terminal 119 when the low speed rotor rotation velocity of the second engine exceeds that of the first engine. Thus gate 117 provides a high level logic signal to an engine failure indicator 120 when the first engine has failed, while AND gate 118 provides a high level logic signal to engine failure indicator 120 when the second engine has failed.

The low speed rotor rotation velocity of the first or second engine may be compared in the same manner to the low speed rotor rotation velocity of other engines on the aircraft to determine which if any of the engines has failed.

Figure 8B:
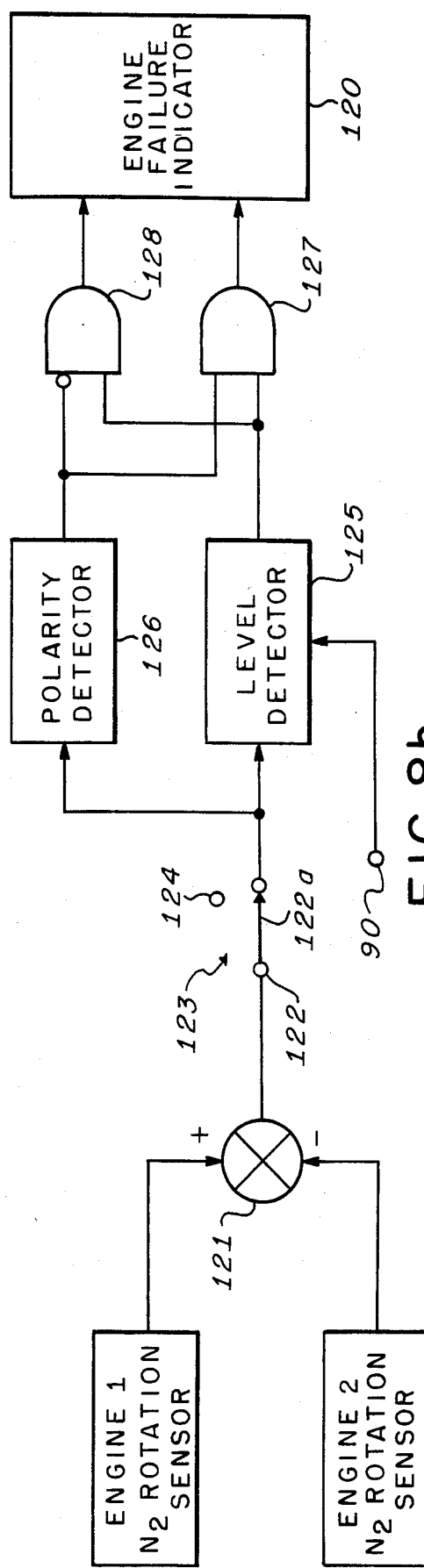

In a similar fashion the high speed rotor rotation velocity $N_2$ of the engines on the aircraft may be compared to provide additional information for the determination of which, if any, engine on the aircraft has failed. As shown in FIG. 8b signals representative of the high speed rototation velocities are coupled to a difference circuit 121, the output signal of which is coupled to the wiper arm terminal 122 of a switch 123. Wiper arm 122a will be in the position shown when both $N_2$ measurements have been determined to be valid, by the process previously described, otherwise the wiper arm 122a will be in contact with terminal 124 to disable the fault indicating circuits. Level detector 125 receives the signal representative of the maximum rotation velocity of the high speed rotors from terminal 90, FIG. 5b. Level detector 125, polarity detector 126 and AND gates 127, 128 cooperate in the manner above described for level detector 117, polarity detector 116 and AND gates 117, 118 to provide indications of engine failure.

FIG. 9 is a block diagram of a network for comparing the measured $N_1$ value of an engine (engine 1) with the value of $N_1$ computed from the measured $N_2$ for that engine, with the computed $N_1$ of another engine (engine 2), and with the calculated windmilling rotation rate for that engine (engine 1). Signals representative of the measured $N_1$ and $N_1$ as calculated from $N_2$ for an engine are coupled to a differencing network 131. The signal output from differencing network 131 is proportional to the difference between the actual $N_1$ measurement and the $N_1$ computed from the measured $N_2$ rate. This difference signal is coupled to switch 132, which is closed when the $N_1$ and $N_2$ measurements are determined to be valid, coupled the difference network 131 output signal to a level detector 133. If either measurement is determined to be invalid the switch 132 is open, decoupling the level detector 133 from the differencing network 131. Level detector 133 compares the difference signal to the signal representative of the maximum measured low speed rotor rotation rate coupled from terminal 80, FIG. 5a. If the level of the difference signal exceeds the level of the maximum rate representative signal, level detector 133 provides a logic 1, signifying a failure, via lead 134 to the engine failure indicator 120 for further action. When the maximum rate representative signal exceeds the difference signal the logic 0, signifying proper engine operation, is coupled via lead 134 to the computer.

The signal representative of the measured $N_1$ value of engine 1 and the signal representative of the $N_1$ value of engine 2 computed from $N_2$ of engine 2 are coupled to differencing network 141 and the difference signal therefrom is coupled to switch 142, which operates in the same manner as switch 132. The difference signal output from network 141 is proportional to the difference of the measured $N_1$ for engine 1 and $N_1$ of engine 2 computed from $N_2$ of engine 2. This difference signal is coupled to level detector 135 and polarity detector 136 which provide output signals, as previously described with respect to level detector 115 and polarity detector 116 of FIG. 8a. The output signals from level detector 115 and polarity detector 116 or coupled to AND gates 137 and 138, which operate in the manner described with respect to AND gates 117 and 118, to provide indications of engine 2 failure.

As stated previously, when an engine fails the low speed rotor, due to windmilling, continues to rotate at a rate determined by the forward speed of the aircraft. This windmilling rotation rate computed as described above, may be utilized as another indicium of engine failure. Refer again to FIG. 9. The calculated windmilling rate signal is coupled from the limiter 105 (FIG. 7) to the positive terminal of the difference amplifier 151, while the signal representative of the low speed rotor rotation rate is coupled to the negative terminal. Thus the output signal of the difference circuit 151 is proportional to the difference between the actual measured $N_1$ and the computed windmilling value. This signal is coupled via switch 152 to polarity detector 153 Switch 152 operates in the same manner as does switch 132. Polarity detector 153 provides a high level signal at output terminals thereof, signifying an engine failure, when the measured $N_1$ is equal to or less than the computed windmilling rotation rate, otherwise the polarity detector 153 provides a low level logic signal, signifying normal engine operation.

It should appreciated by those skilled in the art that the present invention provides an improved method for timely and reliable detection of a failed jet engine. This is accomplished by determining allowable differences in rotor rotational velocities as a function of the maximum rotational velocity of the engines being tested to provide for normal differences in engine performance due to throttle handle rigging errors, differences in fuel control valves etc.; comparing the difference in the low speed rotor rotational velocities of any number of engines against the computed allowable difference; comparing the high speed rotor rotational velocities of any number of engines against the computed allowable differences; comparing the difference between the low speed rotor rotational velocity and a computed low speed rotor rotation velocity to the computed allowable difference; and comparing low speed rotor rotation velocity to a computed windmilling value. The plurality of testing performed by the invention allows a single measuring device failure on each engine to be tolerated without significantly effecting the ability to detect an engine failure.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for testing jet engines mounted on an aircraft, the jet engines of the type having a high speed rotor and a low speed rotor, comprising:
   representative signal means for providing first representative signals representative of rotation rates of said low speed rotor in said jet engines and second representative signals representative of rotation rates of said high speed rotor in said jet engines;
   equivalent signal means coupled to receive said second representative signals for deriving equivalent signals representative of low speed rotor rotation rates of normally operating jet engines having high speed rotor rotation rates represented by said second representative signals;
   first difference signal means coupled to receive said first representative signals and said equivalent signals for providing first difference signals representative of differences between said first representative signals and said equivalent signals;
   means for providing threshold signals;
   first detector means coupled to said threshold signals means and said first difference signal means for comparing said threshold signals and said first difference signals to provide first detected signals representative of values of said first difference signals relative to said threshold signals; and
   engine failure indicator means coupled to receive said detected signals for determination of engine failures.

2. A jet engine testing apparatus in accordance with claim 1 wherein said equivalent signal means includes:
   scale factor means coupled to said representative signal means for scaling said second representative signals in accordance with a first preselected scale factor;
   constant value means for providing first constant value signals; and
   second difference signal means coupled to said scale factor means and said constant value signal means for providing second difference signals representative of differences between said scaled second representative signals and said constant value signals to establish said equivalent signals; and
   limiter means coupled between said first and second difference signal means for providing said equivalent signals at values bound by preselected limits.

3. A jet engine testing apparatus in accordance with claim 1 wherein said threshold signals means comprises:
   selection means coupled to receive said first representative signals for selecting one of said first representative signals having a value greater than values of all other first representative signals, thereby providing a first representative signal of maximum value;
   scale factor means coupled to said selection means for scaling said first representative signal of maximum value in accordance with a preselected scale factor thereby providing a scaled maximum value signal;
   constant value means for providing a constant value signal;
   second difference signal means coupled to said scale factor means and said constant value means for providing second difference signals representative of differences between said scaled maximum value signal and said constant value signal; and
   limiter means coupled between said second difference signal means and said detector means for limiting said second difference signal between predetermined bounded values to establish a first threshold signal for said detector means.

4. A jet engine testing apparatus in accordance with claim 3 wherein:

said second representative signals include signals representative of rotation rates of said high speed rotor in first and second jet engines;

said equivalent signal means is coupled to receive said first and second jet engine high speed rotor rotation rate representative signals for providing equivalent low speed rotor rotation rate representative signals of normally operating first and second jet engines;

said first difference signal means is coupled to receive said first representative signals of said first jet engine and said equivalent low speed rotor rotation rate representative signals of said first and second jet engines for providing said first difference signals comprising first equivalent difference signals representative of differences between said first representative signals of said first jet engine and said equivalent low speed rotation rate representative signals of said first jet engine, and second equivalent difference signals representative of differences between said first representative signals of said first jet engine and said equivalent low speed rotation rate representative signals of said second jet engine;

said first detector means is coupled to receive said first and second equivalent difference signals for providing first detected equivalent signals representative of values of said first equivalent difference signals relative to said threshold signal and second detected equivalent signals representative of values of said second equivalent difference signals relative to said threshold signal; and wherein said testing apparatus further includes:

polarity detector means coupled to receive said second equivalent difference signal for determining signal polarity of said second equivalent difference signals and providing polarity representative signals indicative of said determined signal polarity; and means coupled to said polarity detector means and to receive said first and second detected equivalent signals for providing engine operation indication signals to said engine failure indicator means.

5. A jet engine testing apparatus in accordance with claim 4 wherein said engine operation indication signals means includes:

a first AND gate having first input means coupled to receive said polarity representative signals, second input means coupled to receive said second detected equivalent signals and output means coupled to said engine failure determination means; and a second AND gate having inverting input means coupled to receive said polarity representative signals, noninverting input means coupled to receive said second detected equivalent signals, and output means coupled to said engine failure indicator means.

6. A jet engine testing apparatus in accordance with claim 1 further including:

means for providing signals representative of aircraft forward velocity;

means coupled to receive said forward velocity representative signals for providing signals representative of windmilling rotation rates due to said forward velocities;

second difference signal means coupled to receive said first representative signals and said windmilling representative signals for providing second difference signals representative of differences between said first signals and said windmilling representative signals; and first polarity detector means coupled between said second difference signal means and said engine failure indicator means for receiving said second difference signals and for providing first polarity representative signals to said engine failure indicator means representative of polarities of said second difference signals.

7. A jet engine testing apparatus in accordance with claim 6 wherein said windmilling rotation rates means includes:

first constant value signal means for providing constant value signals;

first scale factor means coupled to said aircraft forward velocity signals means for providing said signals representative of aircraft forward velocity scaled in accordance with a preselected scale factor;

sum means coupled to said first scale factor means and to receive said constant value signals for providing signals representative of sums of said constant value signal and said scaled aircraft forward velocity representative signals; and first limiter means coupled between said sum means and said second difference signal means for bounding said sum signals between preselected limits and providing bounded signals to said second difference signal means.

8. A engine testing apparatus in accordance with claim 7 wherein:

said first representative signals include signals representative of rotation rates of said low speed rotor in first and second jet engines;

said first difference signal means is coupled to receive said low speed rotor representative signals of said first and second jet engines for providing third difference signals representative of differences between said low speed rotor representative signals of said first jet engine and said low speed rotor representative signals of said second jet engine;

said threshold signals means provides a first threshold signal;

said first detector means is coupled to receive said third difference signals and said first threshold signal for providing low speed rotor detected difference signals representative of relative values of said second difference signals and said first threshold signal; and further includes:

second polarity detector means coupled to receive said third difference signals for determining signal polarity of said third difference signals and providing second polarity representative signals indicative of said signal polarity of said third difference signals; and engine operation indication signal means coupled to receive said second polarity representative signals and to receive said low speed rotor detected difference signals for providing low speed rotor data to said engine failure indicator means.

9. A jet engine testing apparatus in accordance with claim 8 wherein:

said second representative signals include signals representative of rotation rates of said high speed rotor in first and second jet engines;

said first difference signal means is coupled to receive said high speed rotor representative signals of said first and second jet engines for providing fourth difference signals representative of differences between said high speed rotor representative signals of said first jet engine and said high speed rotor representative signals of said second jet engine;

said threshold signal means provides a second threshold signal;

said first detector means is coupled to receive said fourth difference signals and said second threshold signal for providing high speed rotor detected difference signals representative of relative values of said fourth difference signals and said second threshold signal;

said second polarity detector means is coupled to receive said fourth difference signals for determining signal polarity of said fourth difference signals and providing third polarity representative signals indicative of said signal polarity of said fourth difference signal; and said engine operation indication signals means is coupled to receive said third polarity representative signals and to receive said high speed rotor detected difference signals for providing high speed rotor data to said engine failure indicator means.

10. A jet engine testing apparatus in accordance with claim 9 wherein said equivalent signal means includes:

second scale factor means coupled to said representative signal means for scaling said second representative signals in accordance with the first preselected scale factor to provide scaled second representative signals;

second constant value means for providing second constant value signals; and third difference signal means coupled to said second scale factor means and said second constant value signal means for providing signals representative of differences between said scaled second representative signals and said second constant value signals to establish said equivalent signals; and second limiter means coupled between said first and third difference signal means for providing said equivalent signals at values bound by preselected limits.

11. A jet engine testing apparatus in acordance with claim 10 wherein said threshold signals means comprises:

selection means coupled to receive said first and second representative signals for selecting one of said first representative signals having a value greater than values of all other first representative signals and selecting one of said second representative signals having a value greater than values of all other second representative signals, thereby providing first and second representative signals of maximum value;

third scale factor means coupled to said selection means for scaling said first representative signal of maximum value in accordance with a preselected scale factor, thereby providing a first scaled maximum value signal;

second constant value means for providing a second constant value signal;

fourth difference signal means coupled to said third scale factor means and said second constant value means for providing fifth difference signals representative of differences between said scaled first representative maximum value signal and said second constant value signal;

second limiter means coupled between said fourth difference signal means and said first detector means for limiting said second differnce signal between predetermined bounded values to establish a first threshold signal for said first detector means;

fourth scale factor means coupled to said selection means for scaling said second representative signal of maximum value in accordance with a predetermined scale factor, thereby providing a second scaled maximum value signal;

third constant value means for providing a third constant value signal;

fifth difference signal means coupled to said third scale factor means and said third constant value means for providing sixth difference signals representative of differences between said scaled second representative maximum value signal and said third constant value signal;

third limiter means coupled between said fifth difference signal means and said first detector means for limiting said sixth difference signals between preselected bounded values to establish a second threshold signal for said first detector means.

12. A jet engine testing apparatus in accordance with claim 11 wherein:

said equivalent signal means is coupled to receive said first and second jet engine high speed rotor rotation rate representative signals for providing equivalent low speed rotor rotation rate representative signals of normally operating first and second jet engines;

said first difference signal means is coupled to receive said first representative signals of said first jet engine and said equivalent low speed rotor rotation rate representative signals of said first and second jet engines for providing said first difference signals comprising first equivalent difference signals representative of differences between said first representative signals of said first jet engine and said equivalent low speed rotation rate representative signals of said first jet engine, and second equivalent difference signals representative of differences between said first representative signals of said first jet engine and said equivalent low speed rotation rate representative signals of said second jet engine;

said first detector means is coupled to receive said first and second equivalent difference signals for providing first detected equivalent signals representative of values of said first equivalent difference signals relative to said first threshold signal and second detected equivalent signals representative of values of said second equivalent difference signals relative to said first threshold signal, said testing apparatus further including;

third polarity detector means coupled to receive said second equivalent difference signals for determining signal polarity of said second equivalent difference signals and providing third polarity representative signals indicative of said determined signal polarity to said engine operation indication signal means wherefrom engine operation indication signals are coupled to said failure indicating means.

13. A jet engine testing apparatus in accordance with claim 12 wherein said engine operation indication signals means includes:
- a first AND gate having first input means coupled to receive said third polarity representative signals, second input means coupled to receive said second equivalent difference signals and output means coupled to said engine failure indicator means; and
- a second AND gate having inverting input means coupled to receive said third polarity representative signals, noninverting input means coupled to receive said second equivalent difference signals, and output means coupled to said engine failure indicator means.

14. A jet engine testing apparatus in accordance with claim 1 further including:
- means for providing third representative signals representative of forward velocities of said aircraft;
- sensor level detector means having pre-established first, second, and third threshold signal levels coupled to receive said first, second, and third representative signals for providing first, second, and third output signals when said first, second, and third representative signals respectively exceeds said first, second, and third threshold signal levels; and
- means coupled to said sensor level detector means for processing said first, second, and third output signals to determine operational status of said representative signal means.

15. A jet engine testing apparatus in accordance with claim 14 wherein said proccessing means includes:
- an exclusive OR gate coupled to receive said first and second representative signals;
- a first AND gate having a first input terminal coupled to said exclusive OR gate and a second input terminal coupled to receive said first representative signals;
- a second AND gate having a first input terminal coupled to said exclusive OR gate and a second input terminal coupled to receive said second representative signals; and
- first and second latches having output terminals coupled to said engine failure indicator means and input terminals coupled respectively to said first and second AND gates, each further coupled to receive said third representative signals as latch enabling signals.

* * * * *